United States Patent [19]

Anderson

[11] 4,228,610
[45] Oct. 21, 1980

[54] WEEDLESS FISHING LURE

[75] Inventor: Edward M. Anderson, Plymouth, Minn.

[73] Assignee: Henry C. Kovar, Anoka, Minn.; a part interest

[21] Appl. No.: 49,294

[22] Filed: Jun. 18, 1979

[51] Int. Cl.³ .................................................. A01K 85/00
[52] U.S. Cl. ...................................... 43/42.41; 43/43.4
[58] Field of Search ................ 43/34, 35, 42.44, 42.5, 43/43.4, 42.41

[56] References Cited

U.S. PATENT DOCUMENTS

| | | | |
|---|---|---|---|
| 1,204,538 | 11/1916 | Belding | 43/35 |
| 3,046,688 | 7/1962 | Leisti | 43/35 |
| 3,159,940 | 12/1964 | Bokun | 43/35 |
| 3,561,151 | 2/1971 | Nehoda | 43/35 |

*Primary Examiner*—Nicholas P. Godici
*Attorney, Agent, or Firm*—Henry C. Kovar

[57] ABSTRACT

A weedless fishing lure has a body with a concavity aft of a leading end, means for mounting a hook rotatably to the body, a fish hook rotatably secured to said means and having an elongate shank and a curl skewed from the shank and an apex where the curl adjoins the shank, and a resilient spring mounted between the body and the hook which rotatably positions the hook with respect to the body in a normally weedless position in which a hook point is in the concavity and the hook apex is outward of the body, the hook is rotatable when the apex is depressed toward the body and the hook point rotates out of the concavity to become exposed, the spring resiliently returns the hook to the normal weedless position, a preferred spring is an elongate helical torsion spring having one end mounted in the body and a second end fastened to the hook.

23 Claims, 6 Drawing Figures

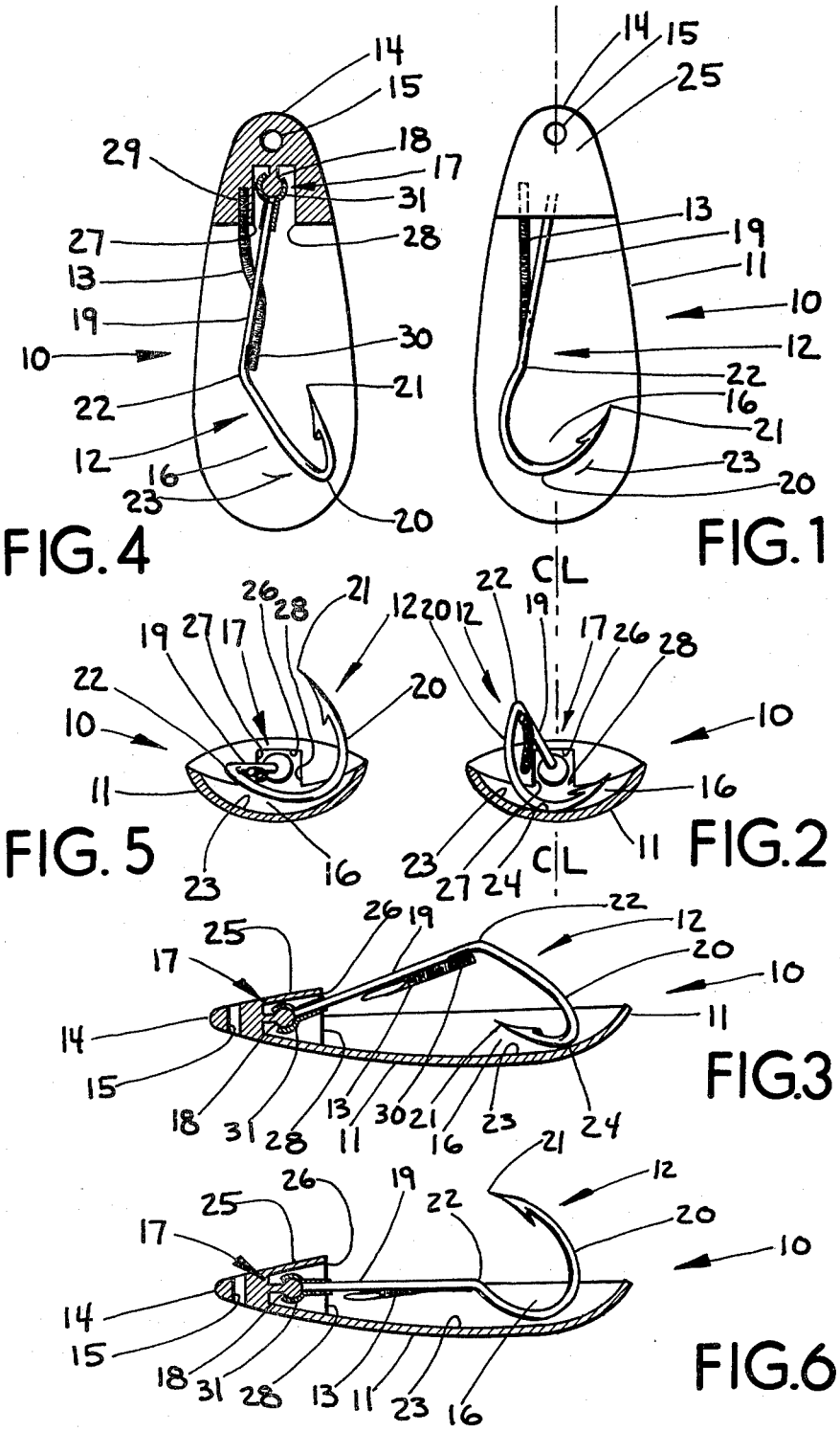

WEEDLESS FISHING LURE

BACKGROUND OF THE INVENTION

1. Field of the Invention

This invention pertains to a weedless fishing lure having the point of the fish hook normally recessed with the hook being rotatable upon a fish strike whereupon the hook point projects outwardly.

2. The Prior Art

The best known prior art is a weedless fishing lure called the JOHNSON spoon. This lure has a spoon body with opposite concave and convex sides. A single fish hook has a shank and most of the hook curl on the concave side, and the hook point is on the convex side. Upon a fish strike, the hook shank is driven towards the concave side and the hook point moves out from the convex side and becomes exposed. The hook point becomes exposed on the side opposite to where force is applied to open the hook, and when opened the hook point is very close to being parallel with the convex side.

OBJECTS OF THE INVENTION

It is an object of the present invention to provide a weedless fishing lure having a recessed hook point which is protrudable on the side of the lure from which the force to expose the hook is applied.

It is an object of the present invention to provide a weedless fishing lure which conceals a hook point in a concavity, with the hook being rotatable for exposing the point.

Many other advantages, features and additional objects of the present invention will become manifest to those versed in the art upon making reference to the detailed description and accompanying drawing in which the preferred embodiment incorporating the principles of the present invention is set forth and shown by way of illustrative example.

SUMMARY OF THE INVENTION

In accordance with the principles of this invention, a weedless fishing lure has a body, a concavity in a side of the body, hook securing means for rotatably securing a hook to the body, a fish hook rotatably secured to the hook securing means and having an elongate shank and a curl of about 180 degrees which is skewed with respect to the shank, and an apex where the curl adjoins the shank, and a resilient spring for maintaining the hook in a normal weedless position in which the point is in the concavity and the apex projects outward of the body, for returning the hook to the normal position from a rotated position in which the hook is rotated by the apex being forced in toward the body and with the hook point rotated out of the concavity.

ON THE DRAWING

FIG. 1 is a plan view of a lower side of the preferred structural embodiment of a weedless fishing lure in accordance with the present invention;

FIG. 2 is an end view of the structure of FIG. 1, with the body of the lure being sectioned;

FIG. 3 is a side view of the structure of FIG. 1 with the body being sectioned;

FIG. 4 is another view of the lower side of the structure of FIG. 1 with the fish hook rotated into a fish catching position;

FIG. 5 is another end view of the structure of FIG. 1 with the fish hook being rotated into a fish catching position; and FIG. 6 is another side view of the structure of FIG. 1 with the fish hook being rotated into a fish catching position.

AS SHOWN ON THE DRAWING

The principles of the present invention are particularly useful when embodied in a weedless fishing lure of the type illustrated in FIG. 1 and generally indicated by the numeral 10. The lure 10 includes a body 11, a fish hook 12, and a spring 13.

The body 11 has a leading end 14, an eye 15 for connection of the leading end 14 to a fishing line (not shown) and a concavity 16 in one side of the body 11 aft of the leading end 14. The body 11 shown is that of a metal spoon. Near the body leading end 14 there is provided hook securing means, generally indicated by the numeral 17, for rotatably securing the hook 12 to the body 11. The preferred hook securing means 17 is a ball joint wherein the ball 18 is fixedly mounted to the body 11 and a socket 31 on and about the ball 18 is mounted to the hook 12. The securing means 17 provides both rotational and angular movement for the hook 12 with respect to the body 11.

The fish hook 12 has an elongate shank 19, a curl 20 of approximately 180 degrees and a hook point 21 for penetrating a fish. The curl 20 is skewed obtusely from the shank 19 and a preferred included angle between the shank 19 and curl 20 approximately a true 135 degrees. At the junction where the curl 20 adjoins the shank 19, there is an apex 22 which is that part of the hook 12 which normally projects the farthest from the body 11. The hook curl 20 rides and bears against an inner surface 23 of the concavity 16 at point 24 and the hook point 21 is normally recessed within the concavity 16. The hook securing means 17 is mounted on the fore-aft centerline, indicated by CL, of the body 11, and the hook shank 19 preferably is angled sideways about 10 degrees with respect to the body 11 as seen in FIG. 1. The point of contact 24 between the curl 20 and the concavity surface 23 is nearer to the fore-aft centerline CL of the body 1.1 than is the hook apex 22 which provides an initially sideways cant to the hook 12 with respect to the body 11 and the concavity surface 23.

A cover 25 is mounted to the body leading end 14 and encloses the hook securing means 17. A inner rear edge 26 of the cover 25 is outside of the hook shank 19 from the body and faces toward and is abuttable against the hook shank 19 for positively limiting movement of the hook 12 outwardly from the body 11 and from the concavity 16. There are lateral stops 27, 28 aft of the hook securing means 17 and to each side of the hook shank 19. The lateral stops 27, 28 face inward and sideways toward and are abuttable against the hook shank 19 for positively limiting sideways movement of the hook 12. The positive limitations of hook 12 movement precludes the hook point 21 and curl 20 from going around the body 11 and ending up jammed on the side of the body 11 opposite to the concavity 16.

The spring 13 is mounted reactively in between the body 11 and the rotatable fish hook 12. If an imaginary straight line is projected through and from the contact point 24 to and through hook securing means 17, the spring 13 is mounted to the hook substantially outward of this line. The spring 13 is biased to apply a rotational torque upon the hook 12 about the imaginary line in a direction which urges the hook apex 22 outward of the body 11 and which urges the hook point 21 into the concavity 16. This rotational torque would be clockwise in the views of FIGS. 2 and 5. The spring 13 is preferably elongate and has a first end 29 fixedly mounted to the body 11 so that it can neither turn nor angularly move with respect to the body 11, and a second end 30 fixedly mounted to the hook 12 adjacent to the apex 22 on the underside, or body side of the hook shank 19. The spring first end 29 is preferably mounted adjacent to one side of and along side of the hook securing means 17. The preferred spring 13 is of the torsion type, in particular the helical torsion type. A specific preferred size of spring 13 is elongate with a diameter approximately the same size as the diameter of the hook shank 19, and specific preferred type has closed coils with a full preload wind. The specific elongate helical torsion spring 13 used for construction of the prototype lure 10, was cut from a length of wire spring drive belt from a movie projector having a wire diameter of 0.010 inch and a coil diameter of 0.062 inch. As best seen in FIGS. 4 and 7, the spring 13 is partially wrapped around the hook shank 19 when the hook 12 is in an alternate fish catching position.

In operation and use of the lure 10, it is pulled through the water and it gyrates and wiggles in the usual and well known manner. It can be pulled through weeds and over underwater obstructions without snagging as the hook point 21 is recessed within the concavity 16. The cover 25 shields the hook securing means 17 and overlaps the hook shank 19 which has a fine angled presentation to weeds and obstructions, and the spring 13 is underneath the hook shank 19 where it will not snag. If the lure 10 does engage an obstruction and the hook point 21 becomes caught in wood for example, the lure 10 can be jiggled around and the spring 13 tends to turn the hook point 21 out of the obstruction and back into the concavity 16, which should help reduce lure losses.

Now, if there's fish in the water, and the barometer, moon, sun, clouds and the like are just right, it may be a lucky day and the fish will bite. Contact against the hook apex 22 depresses the apex 22 inwardly towards the body 11 and the hook 12 rotates around in the securing means 17 and the hook point 21 comes out of the concavity 16 and projects outwardly from the lure 10. This fish catching position is shown in FIGS. 4, 5 and 6. Then if luck is still with us, the fish will be hooked and retrieved. After the lure 10 is removed from the fish, the spring 13 will resiliently rotate the hook 12 back in to the normal position as shown in FIGS. 1, 2 and 3. An advantage of the lure 10 is that the hook point 21 comes out of and protrudes from the same side of the lure 10 as that part of the hook 12 which is depressed by contact with a fish, specifically the apex 22.

Although other advantages may be found and realized and various modifications may be suggested by those versed in the art, it should be understood that I wish to embody within the scope of the patent warranted hereon, all such embodiments as reasonably and properly come within the scope of my contribution to the art.

I claim as my invention:

1. A weedless fishing lure comprising:
   (a) a body having a leading end, means for connecting the leading end to a fishing line, and a concavity in one side of the body and aft of the leading end;
   (b) hook securing means mounted to the body for rotatably securing a fish hook to the body;
   (c) a fish hook rotatably secured to the securing means and having
      (1) an elongate shank,
      (2) a curl of approximately 180 degrees in between the shank and a hook point, said curl being skewed from the shank, and
      (3) an apex where the curl adjoins the shank; and
   (d) a resilient spring reactively mounted in between the body and the rotatable hook, said spring rotatably positioning the hook with respect to the body in a normally weedless position in which the hook point is within the concavity and in which the hook apex projects outwardly of the body, said spring being operable for resiliently returning the hook to the normal weedless position from an alternate fish catching position in which the hook is rotated with respect to the body with the apex having been depressed toward the body and the hook point being exposed outside of the concavity and the body.

2. A lure according to claim 1, in which the hook securing means is a ball joint.

3. A lure according to claim 2, in which the ball joint has a ball mounted to the body and the hook shank has a socket mounted to the ball.

4. A lure according to claim 1, in which the curl is obtusely skewed from the shank.

5. A lure according to claim 4, in which the curl is skewed at an angle of approximately 135 degrees.

6. A lure according to either of claims 1, 4 or 5 in which the hook curl rides against an inner surface of the concavity.

7. A lure according to claim 6, in which a point of contact between the hook curl and the concavity is nearer to a fore-aft centerline of the body than is the hook apex.

8. A lure according to either of claims 1, 4 or 5 in which the hook securing means is on a fore-aft centerline of the body, and in which the hook shank is angled sideways with respect to the body.

9. A lure according to either of claims 1, 2 or 3 including a cover over and enclosing the hook securing means.

10. A lure according to claim 1, including stop means aft of the hook securing means outside of the hook shank from the body and facing toward and abuttable against the hook, for positively limiting movement of the hook curl out of the concavity.

11. A lure according to either of claims 1 or 10, including lateral stop means aft of the hook securing means and facing sideways toward and abuttable against the hook, for positively limiting sideways movement of the hook.

12. A lure according to either of claims 1, 4, 5 or 10, in which the body is a spoon and in which the hook point is within the concavity in one side of the spoon.

13. A lure according to claim 1, in which the spring is a torsion spring.

14. A lure according to claim 13, in which the torsion spring is of the helical type.

15. A lure according to claim 14, in which the helical torsion spring is elongate, with a first spring end being mounted to the body adjacent the hook securing means and a second spring end being fastened to the hook adjacent the apex.

16. A lure according to claim 15, in which the first spring end is mounted fixedly in the body.

17. A lure according to claim 15, in which the first spring end is mounted alongside the hook securing means.

18. A lure according to claim 15, in which the second spring end is fastened to the underside of the hook.

19. A lure according to claim 15, in which the second spring end is fixedly fastened to the hook.

20. A lure according to either of claims 14, 15, 16, 17, 18 or 19 in which the helical torsion spring is of the closed coil preloaded type.

21. A lure according to either of claims 15, 18 or 19 in which the spring has a diameter approximately of the same size as the diameter of the hook shank.

22. A lure according to either of claims 15, 18 or 19, in which the spring is partially wrapped around the hook shank when the hook is in the alternate fish catching position.

23. A lure according to either of claims 1 or 15, in which the hook curl rides against a contact point upon an inner surface of the concavity, said hook being rotatable about an imaginary line projected from the point through the hook securing means, and in which the spring is mounted to the hook substantially outward of the imaginary line and is biased to apply a rotational torque upon the hook about the imaginary line in a direction which urges the hook apex outward of the body and the hook point into the concavity.

* * * * *